(12) United States Patent
Brandsma

(10) Patent No.: US 6,875,143 B2
(45) Date of Patent: Apr. 5, 2005

(54) TRANSMISSION BELT PROVIDED WITH TRANSVERSE ELEMENTS HAVING A DISPLACEABLE CONTACT LINE

(75) Inventor: Arjen Brandsma, Tilburg (NL)

(73) Assignee: Van Doorne's Transmissie B.V., AM Tilburg (NL)

( * ) Notice: Subject to any disclaimer, the term of this patent is extended or adjusted under 35 U.S.C. 154(b) by 0 days.

(21) Appl. No.: 10/028,440

(22) Filed: Dec. 28, 2001

(65) Prior Publication Data

US 2002/0128103 A1 Sep. 12, 2002

(30) Foreign Application Priority Data

Dec. 28, 2000 (EP) ............................................. 00204820

(51) Int. Cl.[7] .................................................. F18G 5/16
(52) U.S. Cl. ........................ 474/242; 474/201; 474/245
(58) Field of Search ................................ 474/201, 237, 474/240, 241, 242, 243, 244, 245, 246, 247

(56) References Cited

U.S. PATENT DOCUMENTS

| | | | |
|---|---|---|---|
| 4,281,483 A | | 8/1981 | Horowitz et al. |
| 4,494,946 A | * | 1/1985 | Wilcox ........................ 474/242 |
| 4,541,822 A | * | 9/1985 | Stiles .......................... 474/201 |
| 4,560,371 A | * | 12/1985 | Hattori ........................ 474/201 |
| 4,618,337 A | * | 10/1986 | Okawa et al. ............... 474/201 |
| 4,655,732 A | * | 4/1987 | Takashima ................... 474/201 |
| 4,968,288 A | | 11/1990 | Lecouturier et al. |
| 5,152,722 A | * | 10/1992 | Yamada ....................... 474/240 |
| 6,074,317 A | * | 6/2000 | Kobayashi ................... 474/201 |

FOREIGN PATENT DOCUMENTS

| | | | |
|---|---|---|---|
| DE | 24 41 569 | 3/1975 | |
| EP | 0 510 990 | 10/1992 | |
| JP | 6-272737 | * 9/1994 | ............. F16G/5/16 |
| JP | 2000-55135 | 2/2000 | |
| JP | 2000-74150 | 3/2000 | |

\* cited by examiner

Primary Examiner—David A. Bucci
Assistant Examiner—Vicky A. Johnson
(74) Attorney, Agent, or Firm—Young & Thompson

(57) ABSTRACT

A transmission belt for a continuously variable transmission includes, transverse elements (5) and an endless carrier (9) for keeping together the transverse elements (5), each transverse element (5) provided with a rocking edge (12) showing a curvature for allowing neighbouring transverse elements (5) to mutually tilt about an substantially axially oriented contact line (7) over a tilting angle ($\alpha$), so that a part of the belt may pass along a longitudinally bent trajectory, the curvature of the rocking edge (12) defined such that it notionally displaces the contact line (7) in dependence on the tilting angle ($\alpha, \beta$).

19 Claims, 2 Drawing Sheets

TRANSMISSION BELT PROVIDED WITH TRANSVERSE ELEMENTS HAVING A DISPLACEABLE CONTACT LINE

BACKGROUND OF THE INVENTION

The present invention relates to a transmission belt for a continuously variable transmission. The present invention also relates to a transmission and to a vehicle wherein such a transmission belt is applied.

Such a transmission belt is generally known, e.g. from EP-A-0.522.612. The elements in the known belt show a lower, or radially inner part that is tapered or is any other way recessed with respect to an upper, or radially outer part. The radially outer part of the elements shows a principal plane by which the elements transmit a pushing force from one to the other in a pushing trajectory part of the belt when it crosses from a first pulley to a second pulley of the transmission. A transition from this principal plane to the recessed lower part is commonly referred to as a rocking edge. The recessed lower part allows adjacent elements to mutually tilt about a contact line on the rocking edge over a certain tilting angle, so that the belt may pass along a curved, i.e. bent trajectory part between sheaves of a pulley of the continuously variable transmission. In the known belt the rocking edge extends over the axial width of the element and shows a curvature in the radial direction of the belt having a radius of about 6 mm, which in the known automotive conforms to the radius of curvature that develops as a stable value after initial, or run in wear of the element.

The transmission realises a continuously variable speed ratio between the first and the second pulley by varying a radius of the bent trajectory part for each of said pulleys in a coordinated manner. The transmission is said to have a ratio coverage, i.e. a measure for the range of speed ratios attainable by the transmission, which is usually defined as the squared value of the quotient of a maximum and the minimum radius of the said bent trajectory part, whereby said radii of the bent trajectory parts are determined by the radial position of the contact line. A large ratio coverage is advantageous for the efficiency of and driving comfort associated with a motor vehicle in which the transmission is to be applied.

SUMMARY OF THE INVENTION

The present invention aims at providing a transmission belt that realises an improved, i.e. extended ratio coverage for a given transmission design, essentially without sacrificing application capabilities of the transmission or the transmission belt.

According to the invention this is achieved by a construction discussed below. An important insight underlying the invention is that in such a construction the radial position of the contact line notionally displaces when the adjacent transverse elements mutual tilt without the overall radial position of the transverse elements notionally changing. Consequently, with respect to the known belt, the maximum and the minimum radius of the bent trajectory parts of the belt have decreased when applied in the transmission, whereby the amount of displacement of the contact line increases with the amount of mutual tilting, i.e. the tilting angle, and is thus inversely proportional to the radius of the bent trajectory part. Since the transmission ratio coverage is determined by the quotient of the maximum and the minimum radius of the bent trajectory parts, it is advantageously increased. An example by way of calculation is provided in the figure description.

Significant advantages can be taken of such construction, whereby the extension in the ratio coverage may favourably be used either directly for improvement of fuel consumption of vehicles or indirectly for reduction of the overall dimensions, i.e. of the required mounting space of the transmission, or for increasing the power transmitting capacity of the transmission while maintaining the original ratio coverage of transmission.

It is noted, that a belt element having a lower element part that shows a curvature of somewhat larger radius than that of the rocking edge is known from publication JP-A-01/098733. By this additional curvature a solution is sought for the problem of abrasion of neighbouring transverse elements in the eventuality that the tilting angle becomes unusually large. This lower curvature joins a rocking edge that is curved according to a radius of the known order of magnitude. The publication teaches to seek for a rocking edge having a relatively small radius of curvature, so as to maintain small relative speed differences between the carrier and the transverse elements. This document does not indicate either of the invented requirements or the effects thereof disclosed by the present invention.

In a further embodiment of the transmission belt according to the invention is characterised in that the rocking edge is defined by at least one of a plurality of radii of curvature, each exceeding 20 mm. It is an advantage of the transmission belt according to the invention that at such a radius of curvature an effective use can be made of the radially shifting rocking line of the transverse elements for significantly increasing the transmission ratio control area. As a consequence, the ratio coverage is extended by 3 to 5% in a typical automotive application of the transmission belt providing extended application capabilities and additional possibilities to achieve a reduced fuel consumption. Alternatively, given a certain distance between the drive and driven pulley axes of the variable transmission this distance can be reduced while the ratio coverage is effectively maintained. The reduced axes distance allows for less voluminous continuously variable transmission, which is a very important advantageous aspect in present day small vehicles. It is remarked that with such large radii of curvature also a Herzian contact stress and accompanying deformation between adjacent transverse elements is advantageously reduced.

A further and surprising advantage of the transmission belt according to the invention as that, when it passes along the bent trajectory part the positional accuracy of the transverse elements with respect to the pulley sheaves is advantageously effected. In particular the tendency of the elements to tilt about an axial of the transmission belt is reduced. When the rocking edge extends in radially inward direction to about half a radial dimension of an axial side face of the elements that is contacting the pulleys, a particularly stable configuration is achieved. This advantage enables that the finishing processing of a protrusion and hole combination, which is incorporated in the known transverse elements for alignment and/or positioning of the elements by the protrusion protruding from the said principle plane of a first element into the hole of an adjacent element, can now be less accurate. A protruding height of the protrusion may even be less pronounced with respect to the overall dimensioning of the transmission belt, because in the belt according to the invention it predominantly serves to align and/or position the elements when they pass from one pulley to the other in the pushing trajectory part where the tilting angle is approximately zero. Accordingly, a further embodiment of the invention is characterised in that the protruding height of the protrusion is smaller than a maximum tilting clearance between two mutually contacting elements when they pass along the bent trajectory part between the sheaves of the pulley, at least when measured in the longitudinal of the belt, i.e. the tangential direction, at the location of the protrusion.

In a still further embodiment of the transmission belt according to the invention the rocking edge is defined by a plurality of radii that continuously increase in a radially inward direction, such that a substantially elliptical curvature is obtained. The elliptical curvature provides additional advantages in that the contact line hardly displaces for relatively small tilting angles, but indeed may displace considerably for relatively large contact angles. This has the effect that the maximum radius of the said bent trajectory part is hardly decreased with respect to the known belt, but that the minimum radius of the said bent trajectory part may decrease considerably, so that the ratio coverage of the transmission may be the most extended.

A following embodiment of the transmission belt according to the invention is characterised in that the radii of curvature defining the rocking edge have a value in the range between 20 mm and 180 mm, preferably between 30 mm and 150 mm, or around 40 mm. Such curvatures can still be manufactured sufficiently accurately to achieve the merits of the invention.

Several other embodiments of the transmission belt according to the invention are feasible, whereby advantageously the actual positioning and freedom of choice of the radii of curvature are of great practical importance. These other embodiments are set out in the remaining subclaims.

It is noted that the publication, JP-A-2000-074150, discloses a belt's transverse element having the said protrusion/hole combination as well as a rocking edge showing a curvature having a radius defined between a minimum value determined by the maximum permissible Herzian stress acting on said rocking edge at any speed ratio of transmission and a maximum value determined by the precondition that a total of clearances including a clearance caused by the Herzian stress acting on the rocking edge is smaller than a protruding height of the element's protrusion part. This document does not indicate either of the invented requirements or the effects thereof disclosed by the present invention.

DETAILED DESCRIPTION OF THE DRAWINGS

At present the transmission belt provided with the transverse elements according to the invention will be elucidated further together with its additional advantages while reference is being made to the appended drawing, wherein similar components are being referred to by means of the same reference numerals. In the drawing.

DESCRIPTION OF THE PREFERRED EMBODIMENTS

Figure 1:
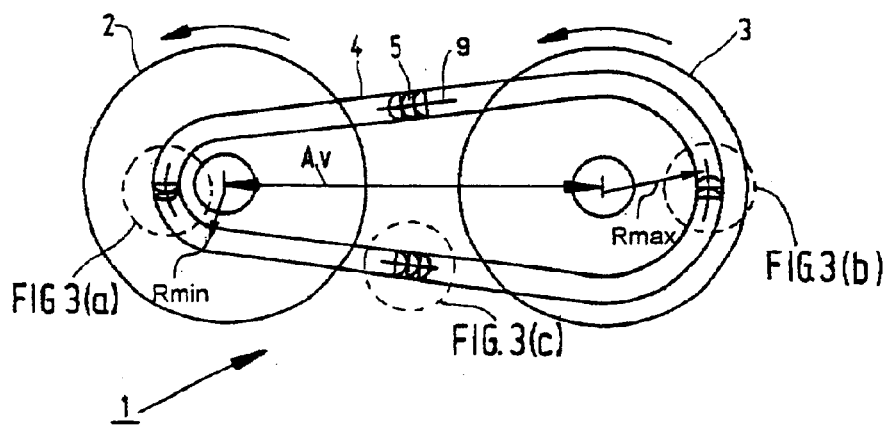
FIG. 1 shows a schematic side view of pulley sheaves and the transmission belt as part of the known continuously variable transmission.

FIG. 1 shows a schematic side view of a continuously variable transmission 1 in cross section. The transmission 1 comprises a drive pulley 2 having a drive sheave pair and a driven pulley 3 having a driven sheave pair. A transmission belt 4 drivingly connects the pulleys 2, 3. Between the sheaves of each pulley 2, 3 a part of the belt runs in a bent trajectory, whereas the belt 4 transmits a pushing force from one pulley 2, 3 to the other in a pushing trajectory part thereof when it crosses between the pulleys 2, 3. The radii of curvature of the bent trajectory parts are controlled in a mutually coordinated manner in order to realise a wanted speed ratio between the said pulleys 2, 3, which control is generally known in the relevant art and will not be discussed further. The said radii can assume a value between a maximum radius of curvature of the bent trajectory part $R_{MAX}$ and a minimum radius of curvature of the bent trajectory part $R_{MIN}$. The transmission belt 4 comprises a carrier 9 and a number of transverse elements 5, the axial side faces 8 thereof being clamped between and in friction contact with the sheaves of the drive 2 and driven pulley 3 respectively for transmitting torque there between.

Figure 2:
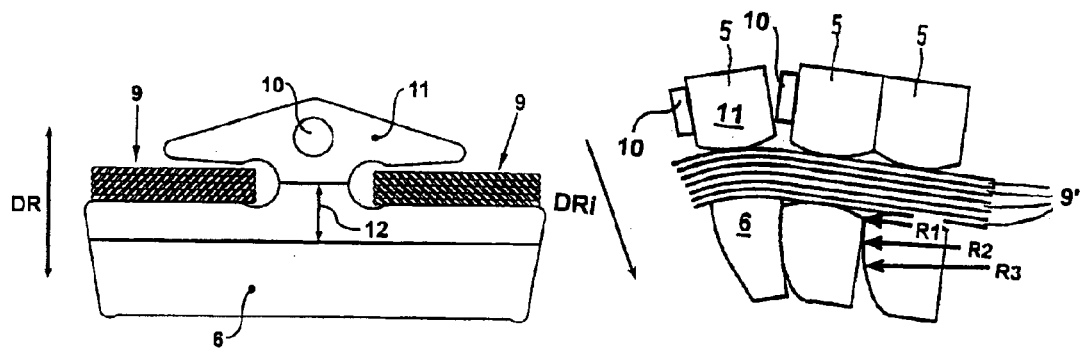
FIG. 2 shows a longitudinal cross section and a side elevation of a possible embodiment of transverse elements for application in the transmission belt according to the invention.

In FIG. 2 a view in the longitudinal direction of the drive belt and in a side elevation thereof is provided. In this example of the transmission belt 4 according to the invention it is shown that the carrier 9 is composed of two sets of radially stacked endless strips, alternatively denoted rings 9'. The elements 5 are provided with a protrusion part 10 protruding from a principle plane 11 thereof, for interaction with a hole (not shown) provided a back side of the element 5, so as to mutually align and/or position two adjacent transverse elements 5. It is further indicated that there is provided a rocking edge 12 forming the transition between the principle plane 11 and a radially inner part 6 of the element 5, which inner part 6 is recessed in the longitudinal direction with respect to other parts of the elements 5. The rocking edge 12 and the recessed inner part 6 allow mutual tilting of the transverse elements 5 so that a part of the belt 4 may assume a bent trajectory as shown by the side elevation. Adjacent elements 5 contact over an axially oriented contact line 7 on the rocking edge 12. According to the invention the rocking edge 12 shows a curvature in the radial direction having a relatively large radius R. By this measure the contact line 7 displaces radially inwardly in dependence on the amount of mutually element tilting.

Figure 3:
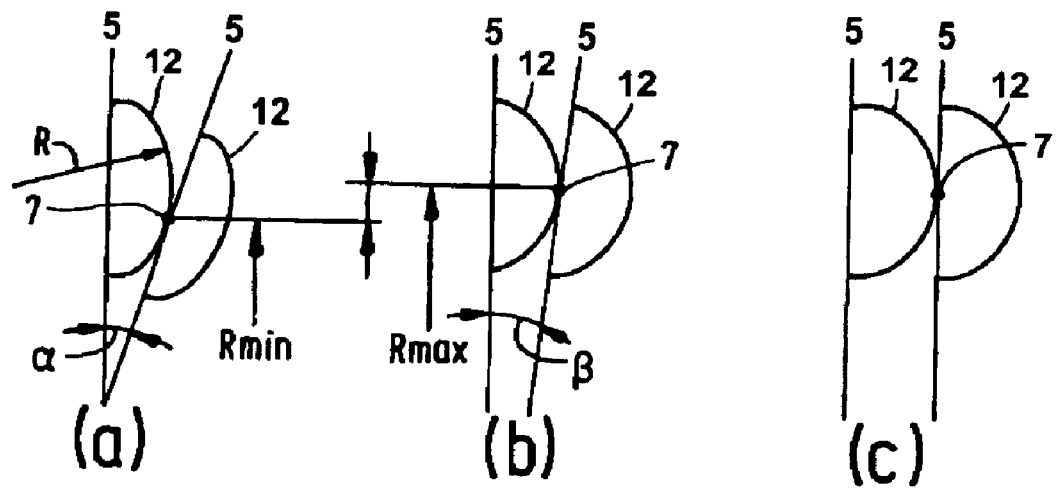
FIG. 3 shows a diagram elucidating the principles of the present invention.
Figure 4:
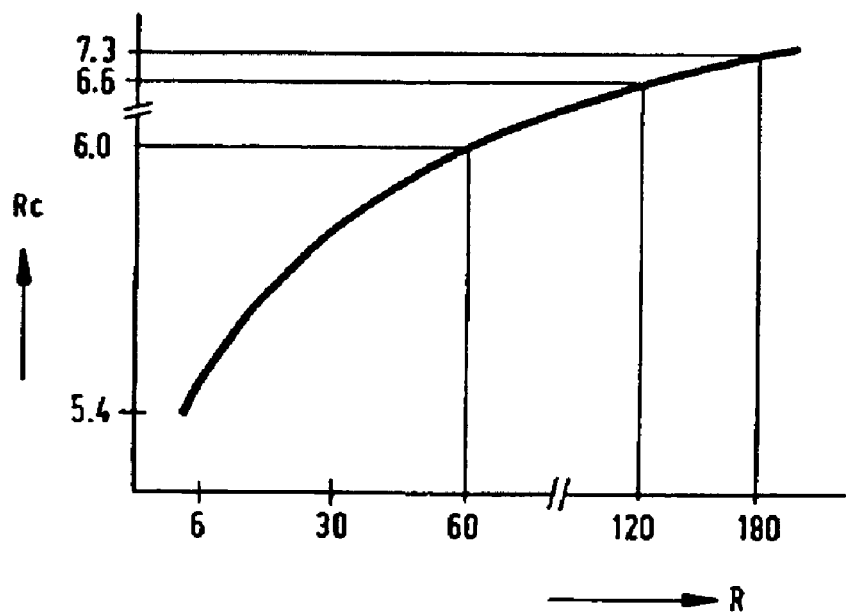
FIG. 4 shows a graph of the ratio coverage of a transmission as a function of the radius of curvature of the rocking edge of the transverse elements of FIG. 2.

The principle of the displaceable contact line is elucidated in FIGS. 3(a), 3(b) and 3(c). These figures schematically show a side elevation of two neighbouring transverse elements 5 provided with a curved rocking edge 12 having a radius R. The elements 5 contact one another at a contact line 7, the radial position of which is determined by the mutual orientation of the elements 5, i.e. the tilting angle α, β. FIG. 3(a) illustrates the position of the neighbouring elements 5 when they pass along the bent trajectory part having the smallest radius of curvature $R_{MIN}$, FIG. 3(b) illustrates the position of the neighbouring elements 5 when they pass along the bent trajectory part having the largest radius of curvature $R_{MAX}$ and FIG. 3(c) illustrates the position of the neighbouring elements 5 when they pass along the pushing trajectory part. From these figures it clearly appears that the contact line displaces and that the displacement is larger for the minimum radius of curvature of the bent trajectory part $R_{MIN}$ than for the maximum radius of curvature of the bent trajectory part $R_{MAX}$. Departing from a transmission 1 incorporating the known transmission belt 4 where the radius R of the curvature of the rocking edge 12 of the transverse elements 5 is about 6 mm, the ratio coverage of that same transmission 1, however incorporating the transmission belt 4 according to the invention, may be approximated by:

$$\Delta\alpha = \tan^{-1}\left(\frac{t}{R_{\text{MIN}}}\right) - \tan^{-1}\left(\frac{t}{R_{\text{MAX}}}\right)$$

$$Rc = \left(\frac{R_{\text{MAX}} + \frac{R \cdot \tan(\Delta\alpha)}{2}}{R_{\text{MIN}} - \frac{R \cdot \tan(\Delta\alpha)}{2}}\right)^2$$

where t is the thickness of the elements 5 in the longitudinal direction of the belt 4; and $\Delta\alpha$ is an approximation of the difference between the tilting angle $\alpha$ associated with the bent trajectory part having the minimum radius of curvature $R_{MIN}$ and the tilting angle $\beta$ associated with the bent trajectory part having the maximum radius of curvature $R_{MAX}$.

In the equations it is assumed that the average radial position of the contact line 7 is the same for the known belt 4 as for the belt 4 according to the invention. Accordingly, it is noted that besides the relative displacement of the contact line 7 during operation of the belt 4, also the absolute position thereof is of influence on the ratio coverage, because when both $R_{MAX}$ and $R_{MIN}$ change by the same absolute amount the quotient thereof, i.e. the ratio coverage, changes too.

From the equations it appears that by proper choice of the radius R of the curvature of the rocking edge 12 the ratio coverage may be manipulated towards a wanted value. In the table I hereafter the characteristic values are shown for several embodiments of the invention with reference to a known transmission 1 typically adopted in automotive applications, where the thickness t of the transverse elements 5 is approximately 1.8 mm and the difference $\Delta\alpha$ is approximately 2°.

TABLE I

| Radius R [mm] | Rc |
|---|---|
| 6 (reference) | 5.4 |
| 60 | 6.0 |
| 120 | 6.6 |
| 180 | 7.3 |

The curvature of the rocking edge 12 may be elliptically or circular or have any other form suitable for displacing the contact line 7. Preferably, from a perspective of functionality and manufacturing the radii of curvature lie in the range above 20 mm, such as between 20 mm and 180 mm, preferably between 30 mm and 150 mm, or around 120 mm. In general it holds that the smaller the thickness t of the transverse elements is, the larger the radius R of the curvature of the rocking edge needs to be in order to realise the same extended ratio coverage. In this respect it is remarked that it is not necessarily required that the rocking edge 12 lies radially inward from the carrier 9 such as in the known belt 4. The rocking edge 12 may at least partly coincide with or even extend beyond the carrier 9 in the radial direction of the transmission belt 4, to allow very large radius R. It is, however, remarked that with the rocking edge 12 according to the invention, the contact line 7 may be displaced over a relatively large distance in the radial direction of the drive belt 4 during operation.

In this respect it is remarked that, according to a further insight underlying the present invention, the rocking edge 12 needs to be positioned and defined such that for at least a part of the belt 4, i.e. for at least one of the bent trajectories between the sheaves of the first and the second pulleys 2, 3, the contact line 7 between two neighbouring elements 5 is located radially inward from the endless carrier 9. Geometrical analysis of the transmission 1 shows that during operation situations occur wherein the elements 5, the carrier 9 and even the rings 9' of the carrier 9 move at different speeds. Combined with a normal force that is generally known to exist during operation between the elements 5 and the carrier 9, as well as between individual rings 9', the speed differences cause friction forces to occur between these belt components 5, 9 and 9'. The present embodiment of the invention effects that the friction force between the elements 5 and a radially inner ring 9' and the friction force between the radially inner ring 9' and an adjacent ring 9' are at all times aligned, i.e. are oriented in similar directions, which a constitutes a considerably more favourable load and load distribution on the radially inner ring 9' compared with oppositely directed friction forces and results in an optimum service life of the belt 4. For a belt 4 that is generally applicable in automotive transmissions this means that the curvature of the rocking edge 12 is preferably defined such that the contact line 7 between two neighbouring elements 5 is located radially inward from the endless carrier 9 at least in a part of the belt 4 that is curved in the longitudinal direction at a radius of curvature of approximately 5 cm.

A graph of the ratio coverage Rc as a function of the radius R of the curvature of the rocking edge 12 in a practical embodiment is shown in FIG. 5. It is clear from the table I and the FIG. 5 that the ratio coverage Rc may be increased some 30%. Alternately it may be preferred to reduce a pulley centre distance Av (see FIG. 1), which saves valuable space and weight of the continuously variable transmission 1.

It is preferred to create the shape of the rocking edge 12 according of the invention by some form of blanking.

Whilst the above has been described with reference to preferred embodiments and best possible modes, it will be understood that these embodiments are by no means to be construed as limiting examples of the continuously variable transmission concerned, because various modifications, features and combinations of features falling within the scope of the appended claims are now within reach of the person skilled in the relevant art.

What is claim is:

1. A transmission belt (4) for a continuously variable transmission (1), comprising:

transverse elements (5); and an endless carrier (9) for keeping together the transverse elements (5), each transverse element (5) provided with a convexly curved, non-circular rocking edge (12) extending between an essentially flat principal plane (11) and a recessed radially inner part (6), the rocking edge defined by a curvature for allowing neighbouring transverse elements (5) to mutually tilt about a substantially axially oriented contact line (7) over a tilting angle ($\alpha$), so that a part of the belt (4) may pass along a longitudinally bent trajectory, wherein, the curvature of the rocking edge (12) is defined by a plurality of radii (R) that continuously increase in a radially inward direction, and the curvature of the rocking edge (12) notionally displaces the contact line (7) in dependence on the tilting angle ($\alpha$, $\beta$).

2. The transmission belt (4) according to claim 1, characterised in that the curvature of the rocking edge (12) is defined by at least one of a plurality of radii (R) exceeding 20 mm.

3. The transmission belt (4) according to claim 1, characterised in that the curvature of the rocking edge (12) is substantially elliptical.

4. The transmission belt (4) according to claim 1, characterised in that the radii (R) of the curvature of the rocking edge (12) lies or lie in the range between 20 mm and 180 mm.

5. The transmission belt (4) according to claim 1, characterized in that each transverse element (5) is provided with a protrusion (10) longitudinally protruding from a principle plane (11) thereof, having a protruding height that is smaller than a maximum tilting clearance (C) in the belt's longitudinal direction at the location of the protrusion (10) between two mutually contacting elements (5).

6. The transmission belt (4) according to claim 1, characterised in that in a radial direction of the transmission belt (4) the rocking edge (12) at least partly coincides with the endless carrier (9).

7. The transmission belt (4) according to claim 6, characterised in that the curvature of the rocking edge (12) is defined such that the contact line (7) between two neighbouring elements (5) is located radially inward from the endless carrier (9) at least in a part of the belt (4) that is curved in the longitudinal direction at a radius of curvature of approximately 5 cm.

8. The transmission belt (4) according to claim 6, characterised in that the transverse element (5) is provided with an axial side face (8) for contact with a pulley (2, 3) of the transmission (1) and in that in the rocking edge (12) extends in the radial direction to approximately half a radial dimension of the axial side face (8).

9. A transverse element (5) for application in the transmission belt (4) according to claim 1, characterised in that the transverse element (5) is manufactured by punching.

10. A continuously variable transmission (1) provided with the transmission belt (4) according to claim 1.

11. The continuously variable transmission (1) according to claim 10 characterised in that the rocking edge (12) of the transverse elements (5) of the transmission belt (4) is defined such that during operation of the transmission (1) and for at least a part of the belt (4) the contact line (7) between two neighbouring elements (5) is located radially inward from the endless carrier (9).

12. The continuously variable transmission (1) according to claim 10, characterised in that the curvature of the rocking edge (12) is defined such that at a minimum radius of a bent trajectory part (RMIN) of the belt (4) the displacement of the contact line (7) is at a maximum.

13. A vehicle provided with a transmission (1) according to claim 10.

14. The transmission belt (4) according to claim 1, wherein the radii (R) of the curvature of the rocking edge (12) lies or lie in the range between 30 mm and 150 mm.

15. The transmission belt (4) according to claim 1, wherein the radii (R) of the curvature of the rocking edge (12) lies around 40 mm.

16. A transmission belt (4) for a continuously variable transmission (1), comprising:

transverse elements (5); and an endless carrier (9) for keeping together the transverse elements (5), each transverse element (5) provided with a convexly curved, non-circular rocking edge (12) extending between an essentially flat principal plane (11) and a recessed radially inner part (6), the rocking edge defined by a curvature for allowing neighbouring transverse elements (5) to mutually tilt about a substantially axially oriented contact line (7) over a tilting angle ($\alpha$), so that a part of the belt (4) may pass along a longitudinally bent trajectory, wherein, the curvature of the rocking edge (12) is defined by a plurality of radii (R) that increase in a radially inward direction forming an elliptical curvature, and the curvature of the rocking edge (12) notionally displaces the contact line (7) in dependence on the tilting angle ($\alpha$, $\beta$).

17. The transmission belt of claim 16, wherein an upper part of the rocking edge has a smaller radius of curvature compared to a lower part of the rocking edge.

18. A transmission belt (4) for a continuously variable transmission (1), comprising:

transverse elements (5); and an endless carrier (9) for keeping together the transverse elements (5), each transverse element (5) provided with a convexly curved, non-circular rocking edge (12) extending between an essentially flat principal plane (11) and a recessed radially inner part (6), the rocking edge defined by a curvature for allowing neighbouring transverse elements (5) to mutually tilt about a substantially axially oriented contact line (7) over a tilting angle ($\alpha$), so that a part of the belt (4) may pass along a longitudinally bent trajectory, wherein, the curvature of the rocking edge (12) is defined by an elliptical curvature notionally displacing the contact line (7) in dependence on the tilting angle ($\alpha$, $\beta$).

19. The transmission belt of claim 18, wherein the curvature of the rocking edge (12) is a plurality of radii (R) that continuously increase in a radially inward direction forming an upper part of the rocking edge with a smaller radius of curvature compared to a lower part of the rocking edge.

* * * * *